United States Patent [19]

Chmela

[11] 4,284,049
[45] Aug. 18, 1981

[54] FUEL INJECTOR VALVE NEEDLE LIFT CONTROL ARRANGEMENT

[75] Inventor: Franz Chmela, Nuremberg, Fed. Rep. of Germany

[73] Assignee: Maschinenfabrik Augsburg-Nürnberg Aktiengesellschaft, Nuremberg, Fed. Rep. of Germany

[21] Appl. No.: 22,485

[22] Filed: Mar. 21, 1979

[30] Foreign Application Priority Data

Mar. 22, 1978 [DE] Fed. Rep. of Germany ....... 2812519

[51] Int. Cl.³ ...................... F02M 47/00; F02M 61/10
[52] U.S. Cl. .................................... 123/467; 123/502; 239/533.8; 239/533.9
[58] Field of Search ................. 123/139 AQ, 139 AT, 123/467, 501, 502; 239/533.3–533.5, 533.7–533.9, 88–96, 124; 251/25

[56] References Cited

U.S. PATENT DOCUMENTS

| | | | |
|---|---|---|---|
| 1,834,224 | 12/1931 | Salisbury | 239/91 X |
| 2,997,994 | 8/1961 | Falberg | 123/139 AQ |
| 3,043,282 | 7/1962 | Janicke | 123/139 AT X |
| 3,640,466 | 2/1972 | Steiger | 239/96 X |
| 3,951,117 | 4/1976 | Perr | 123/139 AQ |
| 3,952,711 | 4/1976 | Kimberley | 123/139 AT X |
| 3,973,536 | 8/1976 | Zelders | 123/139 AT X |
| 4,170,974 | 10/1979 | Kopse et al. | 123/139 AT |
| 4,187,822 | 2/1980 | Craven et al. | 123/139 AQ X |

FOREIGN PATENT DOCUMENTS 808206  1/1959  United Kingdom ................. 239/533.5

*Primary Examiner*—Stuart S. Levy
*Attorney, Agent, or Firm*—Becker & Becker, Inc.

[57] ABSTRACT

Control of valve needle lift in fuel injections for direct-injection internal combustion engines wherein an injector having at least one fuel supply pipe and one leak-off pipe is provided with a nozzle body in which is situated an axially slidably supported valve needle which is maintained by the force of at least one closing spring in its closing position and capable of being lifted off its valve seat by the pressure of the fuel. A sleeve is provided with connecting ports or openings in the injector which sleeve is capable of being moved axially by means of a hydraulic control medium. The connecting openings or ports can be covered by a piston when the end face of the sleeve is acted upon by the control medium, and when the valve needle is lifted off its valve seat, permitting the valve needle lift to be reduced.

10 Claims, 2 Drawing Figures

FUEL INJECTOR VALVE NEEDLE LIFT CONTROL ARRANGEMENT

The present invention relates to an arrangement for control of the lift of a valve needle in fuel injectors of direct-injecting internal combustion engines having a nozzle body mounted in an injector housing provided with at least one fuel supply conduit, and an outlet means for leak-off conduit. The nozzle body contains an axially slidably supported valve needle which is maintained in its closing position by the action of at least one closing spring, and which is adapted to be lifted from its valve seat by the action of the fuel.

Such fuel injectors are known in the art. They are used in engines operating on gas oil (Diesel oil) and engines operating on gasoline. In these injectors, it is advantageous, for various reasons, to adjust the fuel spray pattern to suit different operating modes or conditions of the engine. This is usually effected by providing control of the lift of the valve needle, whereby the pertaining characteristic of the closing spring is varied accordingly, so that a needle lift or stroke which is a function of the injection pressure is attained. The same effect can be obtained when using two closing springs having different spring characteristics.

However, such designs suffer from drawbacks, namely, use of the injection pressure since the controlling parameter amounts to an unacceptable restriction of the required function, and because definition of the limits of the needle lift or stroke is rather inaccurate and poorly reproducible when creating an equilibrium between the closing spring force and the needle force, due to the magnitude of the forces and the particular slope of the spring characteristic.

It is an object of the invention to avoid the aforementioned drawbacks, and to provide control of the valve needle lift or stroke for such fuel injectors, which enables accurate adjustment or matching of the fuel spray pattern to various operating modes of the engine.

This and other objects and advantages of the invention will appear more clearly from the following specification in connection with the accompanying drawings, in which.

Figure 1:
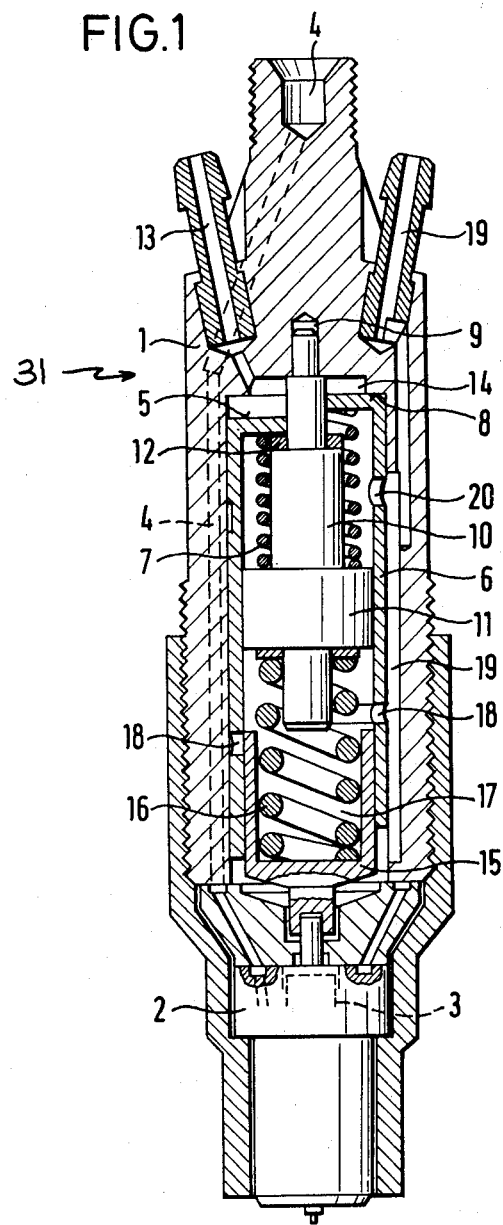
FIG. 1 is a vertical sectional view of the arrangement according to one embodiment of the invention.

The arrangement for control of the lift or stroke of a valve needle is primarily characterized by an axially displaceable control sleeve arranged within a hollow housing, said sleeve being movable in response to a hydraulic control medium. The control sleeve has control openings or ports which can be closed by a piston, when a closed end of the sleeve is contacted by the control medium and upon lifting of the valve needle from the valve seat, so that the needle lift or stroke is thereby reduced.

Thus, control of the lift or stroke of the valve needle is provided by a hydraulic control which is substantially independent of the spring characteristic of the closing spring, so that the associated functions of needle loading and lift or stroke limitation are separated. Furthermore, variation of the needle lift or stroke is readily achieved, without removal of parts.

According to one embodiment of the invention, it is proposed to maintain the sleeve by a return spring in its inoperative position in which it bears against a land provided in the arrangement. The return spring may be weak in design, because it has to overcome only the acceleration forces at the sleeve and the friction.

The piston adapted to cover the openings or ports is preferably formed to provide a spring seat, and is located between the valve needle and the closing spring, and is constructed so as to be movable in an axial direction in the sleeve.

According to the invention, it is also proposed to secure a pin penetrating the end face of the sleeve in the upper part of the housing. The pin has a collar sealingly contacting the inner surface of the sleeve. The collar serves, on the one hand, to close the pressure space formed by the sleeve and the piston and, on the other hand, forms an abutment for the return spring. The collar also serves as an abutment for the closing spring which is accommodated in the pressure space so as to save space.

Adaptation, matching or adjustment of the stiffness of the return spring to the pressure of the control medium can be effected either by continuously varying the position of the sleeve and, consequently, the valve needle stop, in response to variations of the control media pressure, or, in a manner such that the sleeve, when acted upon by the control medium, is moved from its rest position directly to a stop, such that the needle lift or stroke is suddenly limited to a small value.

The fuel intended for the internal combustion engine can be used as the hydraulic control medium, thereby eliminating the need for an additional pump, reservoir, filter, etc. Since only small forces are required to actuate the sleeve, because only the weak return spring and friction have to be overcome, it is appropriate to use the pressure difference between the suction side of the injection pump (suction chamber) and the leak-off circuit or outlet means as the control pressure. Thus, the control medium is preferably passed through a control conduit from that section of the suction conduit which is located between the filter and the injection pump. A three-way valve, preferably a solenoid-operated three-way valve, is provided in the control circuit to permit control medium to move, on the one hand, from the suction or intake conduit, into the injector, so as to limit the needle lift or stroke, and, on the other hand, from the injector, via a relief conduit, into the fuel tank or reservoir, so as to cancel the lift or stroke limitation.

Control of the solenoid-operated three-way valve is based upon any suitable parameters, but is preferably dependent on the load and/or speed of the internal combustion engine.

Referring now particularly to the drawings, in FIG. 1, a fuel injector 31 includes a nozzle housing 1 and a nozzle body 2, in which a nozzle valve needle 3, only shown in part, is arranged so as to move longitudinally in axial direction. Fuel is delivered, in a known manner, through a fuel inlet passage 4, shown 90° offset by dash lines in the cross sectional view of FIG. 1, to the nozzle body 2 and, consequently, to the valve needle 3 shown near the bottom of FIG. 1. Slidably supported in an axial direction, in housing 1 is a sleeve 6 having an end face 5. The sleeve in its rest position due to return spring 7 can bear against a land 8 of the housing 1. This position is indicated on the right-hand side of FIG. 1.

A pin 10 having a stepped configuration formed by a plurality of diameters is secured in the upper part of the housing 1 in a hole 9 and penetrates the end face 5 of the sleeve 6. The pin contacts the inner wall of the sleeve 6 tightly with a collar 11, which forms the abutment face for the return spring 7. Also fitted on the pin 10 is an adjustment disc 12, to limit the maximum lift or stroke of the sleeve 6, indicated on the left-hand side of FIG. 1. This position is attained when the hydraulic control medium is admitted, via a control medium inlet 13, into the space 14, the pressure of which at least overcomes the force of the return spring 7 and friction.

A piston 15 providing a spring seat for spring 16 is connected to the valve needle 3 by a tight fit in the lower end of the hollow sleeve 6. Piston 15 is adapted to move longitudinally in axial direction in sleeve 6 and is forced in the direction of its rest position by the closing spring 16 which bears against the opposite face of collar 11, so that the valve needle 3 is seated on the pertaining valve seat.

The collar 11, the sleeve 6, and the piston 15 form a pressure space 17 which, as is shown on the left-hand side of FIG. 1, may be completely closed during operation. However, if the sleeve 6 is in its rest position, as is indicated on the right-hand side of FIG. 1, it will connect the pressure space 17, through the connecting openings or ports 18 with a leak-off conduit or output 19, in other words, the pressure will be reduced to zero. Finally, there are also relief port means 20 in the sleeve 6 for the upper free space therein.

Figure 2:
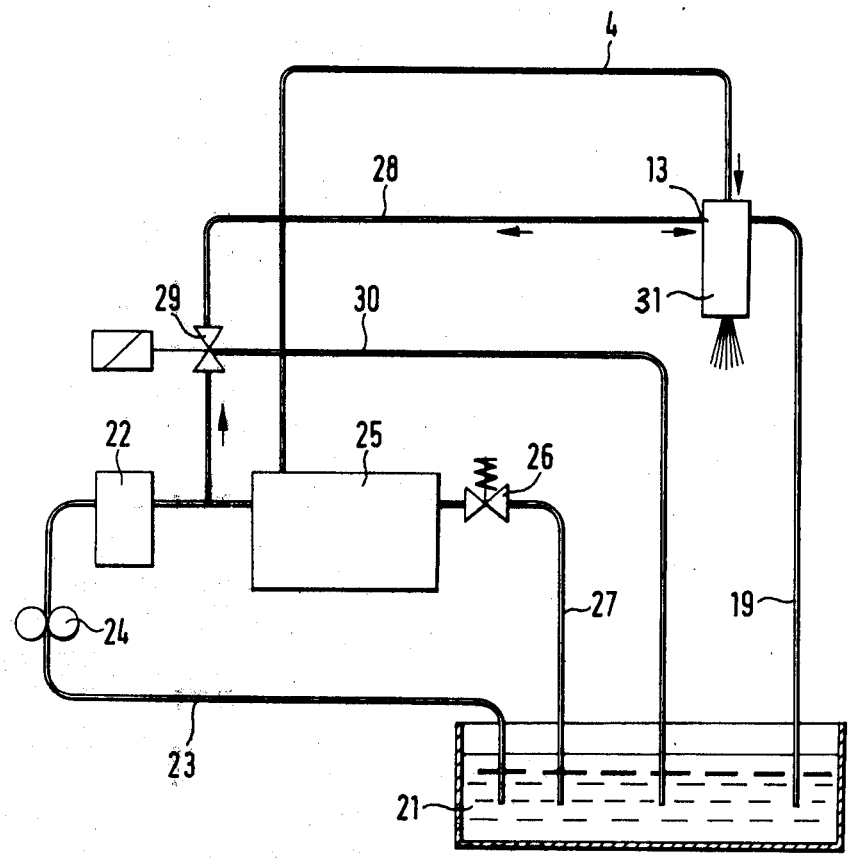
FIG. 2 is a control diagram showing arrangements of the fluid control conduits and pertaining connections of the fuel injection system.

With reference to FIG. 2, the numeral 31 denotes the fuel injector including the injection nozzle arrangement shown in detail in FIG. 1. Fuel is passed from fuel tank 21, through intake or suction conduit 23 and a filter 22, the fuel being moved by a pump 24 to the injection pump 25 of an engine, not shown in the diagram, the pump 25 delivering the fuel, at a high pressure, through the fuel conduit 4 to the housing 1, in a known manner. The leak-off conduit or outlet 19 passes fuel from housing 1 back to the fuel tank 21, as is done by a drain pipe 27 with a relief valve 26 associated with the injection pump 25. From the suction conduit 23, in which a low pressure prevails, a control conduit 28 leads to the control medium inlet 13 of the housing 1 (FIG. 1). A solenoid-operated three-way valve 29 permits connection of conduit 28, alternatively, as desired, to relief conduit 30 leading to the fuel tank 21.

METHOD OF OPERATION

When the lift or stroke of the valve needle 3 is not to be limited, the solenoid-operated three-way valve 29 connects the control conduit 28 to the relief conduit 30, space 14 in the housing 1 remains at "0" pressure, and the sleeve 6 is in its rest position, in which the pressure space 17 communicates continuously via the connecting ports 18 with the leak-off conduit 19.

If limiting of the needle lift or stroke is required, the solenoid-operated three-way valve 29 connects the suction conduit 23 to the control conduit 28, so that the space 14 is under pressure, and the sleeve 6 is moved into the position indicated on the left-hand side in FIG. 1. The piston 15, forced upwardly by action of fuel delivered through inlet passage 4 to the nozzle body 2 and consequently to the valve needle 3 as set forth and described previously, now covers the connecting ports 18, before the valve needle 3 has reached its end stop. The fluid cushion remaining in the pressure space 17, thus, prevents further opening of the valve needle 3 and, thus, acts as a controllable valve needle stop.

It is, of course, to be understood that the present invention is in no way restricted to the specific disclosure of the specification and drawings, but also encompasses any modification within the scope of the appended claims.

I claim:

1. An arrangement for controlling the lift of a valve needle in fuel injectors of direct injection internal combustion engines, said arrangement comprising:

a hollow housing having a discharge end and an end face remote from said discharge end, said valve needle being axially displaceably supported in the discharge end of said housing for movement between a first seated position and a second unseated position, said housing having fuel inlet means operatively connected to said valve needle for supply fuel thereto, control medium inlet means for supplying control medium to said end face, and outlet means for communicating the hollow interior of said housing with the outside;

a sleeve axially displaceably arranged within the hollow interior of said housing, said sleeve being open towards said discharge end and closed at said end remote from said discharge end for receiving control medium between said closed end of said sleeve and said end face of said housing, said sleeve having at least one opening for communicating the interior of said sleeve with said outlet means;

piston means axially displaceably arranged within the hollow interior of said housing at the open end portion of said sleeve for closing said at least one opening, said piston means being operatively connected with said valve needle;

at least one spring means operatively arranged between said sleeve and said piston for resiliently acting upon said valve needle, the control of the lift of said valve needle being substantially independent of spring characteristic;

a further spring means for resiliently retaining said sleeve in a position wherein said closed end of said sleeve contacts said housing end face;

said piston means being axially movable within said sleeve and said piston means including an aperture open away from said valve needle for receiving therein a pertaining end of said at least one spring means;

a control pin having a first end extending through said closed sleeve end, a second end extending within said sleeve towards said piston means, and a collar between said first end and said second end for the provision of first and second annular shoulders, said collar being in sealing contact within said control sleeve, said further spring means being in contact with said first annular shoulder, and said at least one spring means being in contact with said second annular shoulder.

2. An arrangement according to claim 1, whereby the valve needle lift is capable of being shortened.

3. An arrangement according to claim 1, and further including an adjustment disc arranged near said first control pin end for limiting movement of said sleeve.

4. An arrangement according to claim 3, wherein said sleeve is movable in the direction corresponding to said first seated position of said valve needle for abutting against said adjustment disc providing a two-point control of the valve needle lift.

5. An arrangement according to claim 1, wherein said at least one opening is arranged so as to be suddenly opened and closed at a predetermined valve needle lift.

6. An arrangement according to claim 1, wherein the position of said sleeve, and thereby the valve needle lift, is continuously controllable in response to supply of control medium to the closed end of said sleeve.

7. An arrangement according to claim 1, wherein said control medium includes a fuel to be injected by said fuel injectors, and further comprising:
 an injection pump for passing a fuel from a fuel reservoir to said fuel inlet means, said fuel pump having a suction chamber for communication with said fuel reservoir; and
 control means for determining the pressure difference between said suction chamber and said outlet means, whereby said sleeve is movable in response to said pressure difference.

8. An arrangement according to claim 7, and further comprising:
 a filter operatively connected to said reservoir;
 first conduit means for communicating said suction chamber of said injection pump with said filter; and
 second conduit means for communicating said first conduit means with said control medium inlet means.

9. An arrangement according to claim 8, and further comprising:
 a three-way valve operatively arranged in said second conduit means; and
 a relief conduit means for communicating said three-way valve with said fuel reservoir.

10. An arrangement according to claim 9, wherein said three-way valve includes a solenoid-operable three-way valve operable as a function of at least one of the parameters of load and speed of said internal combustion engine.

* * * * *